United States Patent
Van Cauteren et al.

(10) Patent No.: US 10,382,838 B2
(45) Date of Patent: Aug. 13, 2019

(54) CABLE MANAGEMENT CLOSURE FOR IMPLEMENTATION AT DISTRIBUTION POINTS

(71) Applicant: TYCO ELECTRONICS RAYCHEM BVBA, Kessel-Lo (BE)

(72) Inventors: Gerd Van Cauteren, Hamme (BE); Dirk Kempeneers, Aarschot (BE); Jan Jozef De Rijck, Holsbeek (BE)

(73) Assignee: CommScope Connectivity Belgium BVBA (BE)

( * ) Notice: Subject to any disclaimer, the term of this patent is extended or adjusted under 35 U.S.C. 154(b) by 0 days.

(21) Appl. No.: 15/513,897

(22) PCT Filed: Sep. 23, 2015

(86) PCT No.: PCT/EP2015/071860
§ 371 (c)(1),
(2) Date: Mar. 23, 2017

(87) PCT Pub. No.: WO2016/046259
PCT Pub. Date: Mar. 31, 2016

(65) Prior Publication Data
US 2017/0303011 A1      Oct. 19, 2017

Related U.S. Application Data

(60) Provisional application No. 62/054,140, filed on Sep. 23, 2014.

(51) Int. Cl.
*H04Q 1/02* (2006.01)
*H04Q 1/14* (2006.01)
(Continued)

(52) U.S. Cl.
CPC ............. *H04Q 1/028* (2013.01); *H04B 10/27* (2013.01); *H04B 10/80* (2013.01); *H04Q 1/146* (2013.01)

(58) Field of Classification Search
CPC ........ H04Q 1/028; H04Q 1/146; H04B 10/27; H04B 10/80
(Continued)

(56) References Cited

U.S. PATENT DOCUMENTS

| | | | | |
|---|---|---|---|---|
| 5,029,958 A | * | 7/1991 | Hodge | G02B 6/4201 385/100 |
| 6,716,054 B1 | * | 4/2004 | Denovich | H01R 4/2433 174/255 |

(Continued)

OTHER PUBLICATIONS

International Search Report and Written Opinion of the International Searching Authority for corresponding International Patent Application No. PCT/EP2015/071860 dated Jan. 22, 2016, 8 pgs.

*Primary Examiner* — Omar R Rojas
(74) *Attorney, Agent, or Firm* — Merchant & Gould P.C.

(57) ABSTRACT

Example management closures (110) enable incoming optical and/or electrical signals to be connected to one or more subscribers (109) via an electrical distribution cable (102). Termination connections within the management closure (110) are connected to active electronic equipment (131) for modifying and/or enhancing the incoming signals. However, the connections between the central office (101), the active electronic equipment (131), and a subscriber (109) need not be made until the subscriber requests a service upgrade. Accordingly, the closure (110) allows for simple and low cost installation of the closure (110) before upgraded service is needed.

14 Claims, 6 Drawing Sheets

(51) Int. Cl.
*H04B 10/27* (2013.01)
*H04B 10/80* (2013.01)
(58) Field of Classification Search
USPC .......................................................... 385/135
See application file for complete search history.

(56) References Cited

U.S. PATENT DOCUMENTS

| | | | | |
|---|---|---|---|---|
| 7,349,616 | B1* | 3/2008 | Castonguay | G02B 6/445 |
| | | | | 385/125 |
| 2006/0153516 | A1* | 7/2006 | Napiorkowski | G02B 6/445 |
| | | | | 385/135 |
| 2009/0080626 | A1 | 3/2009 | Mullaney | |
| 2010/0329622 | A1* | 12/2010 | Kutsuzawa | G02B 6/445 |
| | | | | 385/135 |
| 2012/0321268 | A1* | 12/2012 | Claessens | G02B 6/4477 |
| | | | | 385/135 |
| 2014/0023334 | A1* | 1/2014 | Larsson | G02B 6/445 |
| | | | | 385/135 |
| 2017/0303011 | A1* | 10/2017 | Van Cauteren | H04Q 1/028 |

* cited by examiner

CABLE MANAGEMENT CLOSURE FOR IMPLEMENTATION AT DISTRIBUTION POINTS

CROSS-REFERENCE TO RELATED APPLICATION

This application is a National Stage Application of PCT/EP2015/071860, filed on Sep. 23, 2015, and claims the benefit of U.S. patent application Ser. No. 62/054,140, filed on Sep. 23, 2014, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wavelength division multiplexers.

Some types of networks include electrical cables (e.g., copper cables) routed from a central office to one or more subscribers. The electrical cables are connected together at various distribution points throughout the network.

Improvements are desired.

SUMMARY

Aspects of the disclosure relate generally to upgrading portions of an existing network of electrical cables. For example, active electronic equipment can be disposed at one or more distribution points within the network. Example active electronic equipment can include equipment to increase the transmission speed or quality of the electrical signals (e.g., G.Fast or VDSL). Accordingly, the electrical (e.g., copper) cables themselves need not be replaced during an upgrade, thereby saving time and resources.

Other aspects of the disclosure relate to upgrading portions of an existing network of electrical cables with optical fibers to provide Fiber to the Distribution Point (FTTdp). One potential problem with upgrading such a network is the expense of upgrading subscriber equipment. In electrical networks, the subscriber equipment is designed to receive electrical signals. To fully implement a fiber optic network, the subscriber equipment would need to be modified. The disclosure enables the ability to substitute optical fibers for the electrical cables at the upstream ends of the network (i.e., the network portions upstream of particular distribution points within the network) without modifying the electrical cables routed to the subscribers from the particular distribution points.

In accordance with some aspects of the disclosure, a management closure enables incoming optical and/or electrical signals to be connected to one or more subscribers via an electrical distribution cable. In certain examples, the distribution cable includes one or more twisted pairs (i.e., differential pairs) of wires. The incoming signals can be passed through active electronics equipment (e.g., modifying and/or enhancing the signals) and then routed to the distribution cable via a termination region within the management closure. However, the connections between a central office, the active electronic equipment, and a subscriber need not be made until upgraded service is to be provided to the subscriber. Accordingly, the management closure allows for simple and low cost installation of the management closure before service is needed.

In accordance with certain aspects of the disclosure, a cable extension (i.e., a cable loop) is routed from an intercept box through which a distribution cable (e.g., an electrical cable) extends, looped into the management closure, and then routed back to the intercept box. In certain examples, the cable extension forms a half-loop within the management closure (i.e., extends from one end of the closure towards an opposite end, makes a U-turn, and extends back to the one end of the closure). In certain examples, the cable extension forms a full loop within the management closure (i.e., extends from one end of the closure towards an opposite end, wraps around the closure in one or more complete circles, and then extends back to the one end of the closure).

In certain examples, the distribution cable is part of a pre-existing network that provides electrical signals to one or more subscribers. In an example, the intercept box and the management closure are installed adjacent an electrical distribution cable of a pre-existing network. The cable extension is looped uncut through the management closure. The ends of the cable extension are stored in the intercept box and the distribution cable is initially uncut.

In accordance with certain aspects of the disclosure, the management closure is provided with conductor trays to manage the twisted pairs of the cable extension loop. For example, a jacket or buffer can be removed from a looped portion of the cable extension to expose the twisted pairs of the cable extension. Optionally, the twisted pairs of the cable extension are grouped together by color sequences. For example, each group may include twisted pairs having the same array of colors (e.g., colored insulation, colored binders, etc.). Because two different groups can each have a twisted pair of the same color, it may be advantageous to keep the groups separate to enhance identification of a twisted pair by group and color.

In accordance with certain aspects of the disclosure, the management closure includes a fiber management tray. In certain examples, a fiber pigtail or fiber stub can extend from the active electronics closure into the fiber management tray of the management closure for storage. In certain examples, the fiber management tray is elevated within the management closure to enhance routing of and access to the cable extension. In certain examples, the fiber management tray is pivotal between a raised and lowered position to provide or enhance access to the cable extension and/or to the termination region.

In accordance with certain aspects of the disclosure, the termination region of the management closure includes a plurality of insulation displacement contact termination blocks. In an example, the termination blocks are HD LSA-PLUS blocks.

In an example, the cable extension can be routed beneath the fiber tray and beneath the termination blocks. Rear sides of the termination blocks are pre-cabled to the active equipment. In an example, the pre-cabling is implemented when the management closure is manufactured at a factory. In another example, the pre-cabling is implemented when the management closure is installed in the field before the cable extension is cut. Pre-cabling the active equipment to the rear sides of the termination blocks inhibits or limits access to these connections in the field.

In accordance with some aspects of the disclosure, the system allows much manual labor to be deferred until activation of special services is needed. When a service upgrade is to be made, one or more selected twisted pairs from the distribution cable can be cut at the intercept box. The ends of the twisted pairs coupled to the central office are connected to one end of the cable extension loop (e.g., to twisted pairs thereof) at the intercept box. The ends of the twisted pairs of the distribution cable coupled to the subscribers are connected to the other end of the cable extension loop (e.g., to twisted pairs thereof). The twisted pairs of the cable extension loop are then cut at an exposed stripped portion of the cable extension loop to connect the central office and the subscriber to the active electronic equipment. In an example, the twisted pairs are cut within the management closure.

In certain examples, the termination blocks have front side termination contacts that are electrically connected to the rear side termination contacts. When a service upgrade is made, a cut end of the cable extension loop (i.e., a cut end of a twisted pair thereof) is routed to one of the termination contacts at the front side of one of the termination blocks to electrically connect the distribution cable to the active equipment. In certain examples, another cut end of the cable extension loop (i.e., a cut end of a twisted pair thereof) also is routed to one of the termination contacts at the front side of one of the termination blocks to electrically connect the active equipment with an incoming signal provided to the cable extension loop at the intercept box.

In accordance with some aspects of the disclosure, the length of the exposed portion of the cable extension loop is sufficiently long for the cut ends of the cable extension loop to be routed to the front sides of the termination blocks.

In accordance with some aspects of the disclosure, the system allows for fiber activation and upgrade where fiber feed from the central office replaces copper feed from the central office. In certain examples, fiber lines from the central office can be routed to the management closure or to the active electronic equipment at which the optical signals are converted to electrical signals. For example, the active electronics box can include equipment for providing optical to electrical signal conversion. In certain examples, the converted electrical signals also can be enhanced (e.g., using G.Fast or VDSL).

In certain examples, the fiber tray provides storage of excess fiber routed to the management closure from the central office. The fiber tray also provides splice mounting locations. The central office fiber lines can be spliced to fiber lines routed to the active electronics box. Optical signals from the central office can be converted to electrical signals and transmitted back to the termination region of the management closure. To connect the converted electrical signals to the subscribers, a selected twisted pair of the distribution cable is cut at the intercept box. The cut twisted pair that connects to the subscriber is electrically connected to a respective twisted pair at the second end of the cable extension loop. The respective twisted pair of the cable extension loop is cut. The portion of this twisted pair that extends from the second end of the cable extension loop is routed to the termination region of the management closure. Accordingly, the electrical signals output by the active electronics equipment are provided to the subscribers. However, the cut twisted pair of the distribution cable that connects to the central office becomes a dead signal carrier. In certain examples, this cut twisted pair of the distribution cable is not connected to the first end of the cable extension loop. In an example, the portion of the cut twisted pair that extends from the first end of the cable extension loop also becomes a dead signal carrier. In an example, the dead signal carrier of the cable extension loop remains within the respective conductor tray.

In some examples, wires of the cable extension are routed in trays instead of cross-connecting them into termination blocks. The omission of a cross-connection structure may reduce the price of each management closure. The omission of a cross-connection structure may reduce the size of each management closure since the closure need not contain cross-connection structure (e.g., additional termination blocks). The routing within the management closure can save time and prevent overdone-installation in situations when fewer than all lines are to be connected to the active equipment. Accordingly, the configuration of the management closure may result in faster installation time because wires are installed only when their installation is requested. Furthermore, internal connections between the active equipment and the cable extension are not made unless the service to a subscriber is to be upgraded. Fewer connections reduces the risk of bad connections.

Advantageously, the conductor trays may enhance the identification of specific wires, thereby simplifying the overall management of the network. Furthermore, in certain examples, the cable extension can be installed within the management closure by positioning the entire cable extension within the management closure and moving the ends of the cable extension out of the management closure through the cable ports. Advantageously, during this type of installation, only the ends of the cable extension need to pass through the cable ports.

Advantageously, the cable extension loop can optionally be installed within the management closure in a clean-room environment. In certain examples, the twisted pairs of the cable extension can be exposed and routed into the conductor trays within the clean room environment. Accordingly, no wires need be directed into the management closure when the closure is disposed in the field. Furthermore, only the twisted pair being cut to upgrade service is handled by a user (e.g., a technician) after the closure is disposed in the field. The remaining twisted pairs are already installed in the conductor trays.

Advantageously, the cabling between the active equipment and the termination field within the management closure can optionally be performed in a clean-room environment before the closure is installed in the field. In certain examples, the connections to the active equipment at the management closure are optionally positioned to inhibit or limit access when the closure is disposed in the field. In certain examples, the active equipment can be optionally sealed within an equipment enclosure in the clean-room environment before being installed in the field.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure relates generally to a management closure that enables incoming optical and/or electrical signals to be connected to one or more subscribers via an electrical (e.g., copper twisted pair) subscriber cable. Termination connections within the management closure are connected to an active electronics closure that holds active electronic equipment for modifying and/or enhancing the incoming signals. However, the connections between the central office, the active electronic equipment, and a subscriber need not be made until the subscriber requests service. Accordingly, the closure allows for simple and low cost installation of the closure before service is needed.

Figure 1:
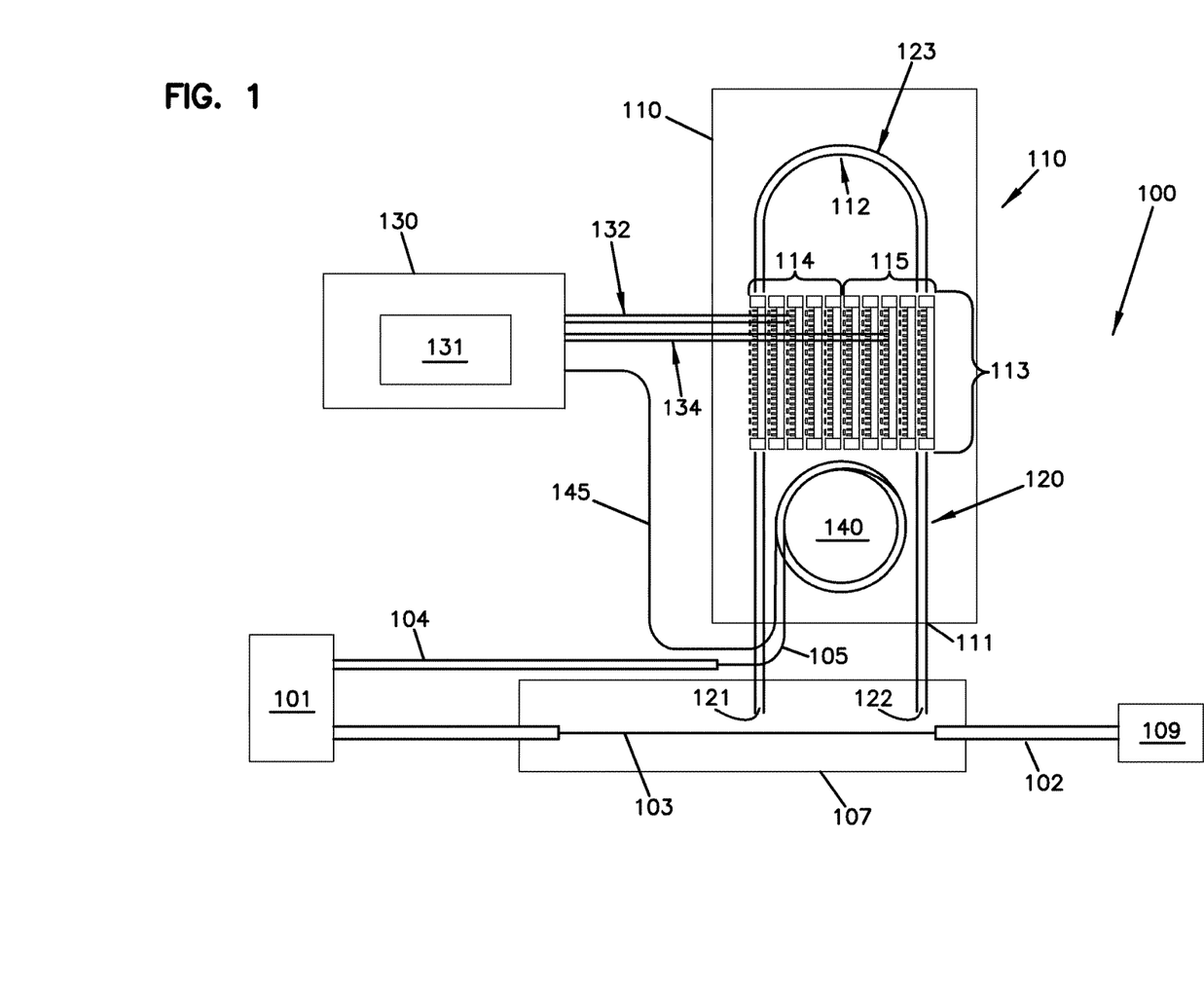
FIG. 1 is a schematic diagram of an example network portion including a management closure installed at a distribution point of a network before any subscribers have requested service/a service upgrade.
Figure 2:
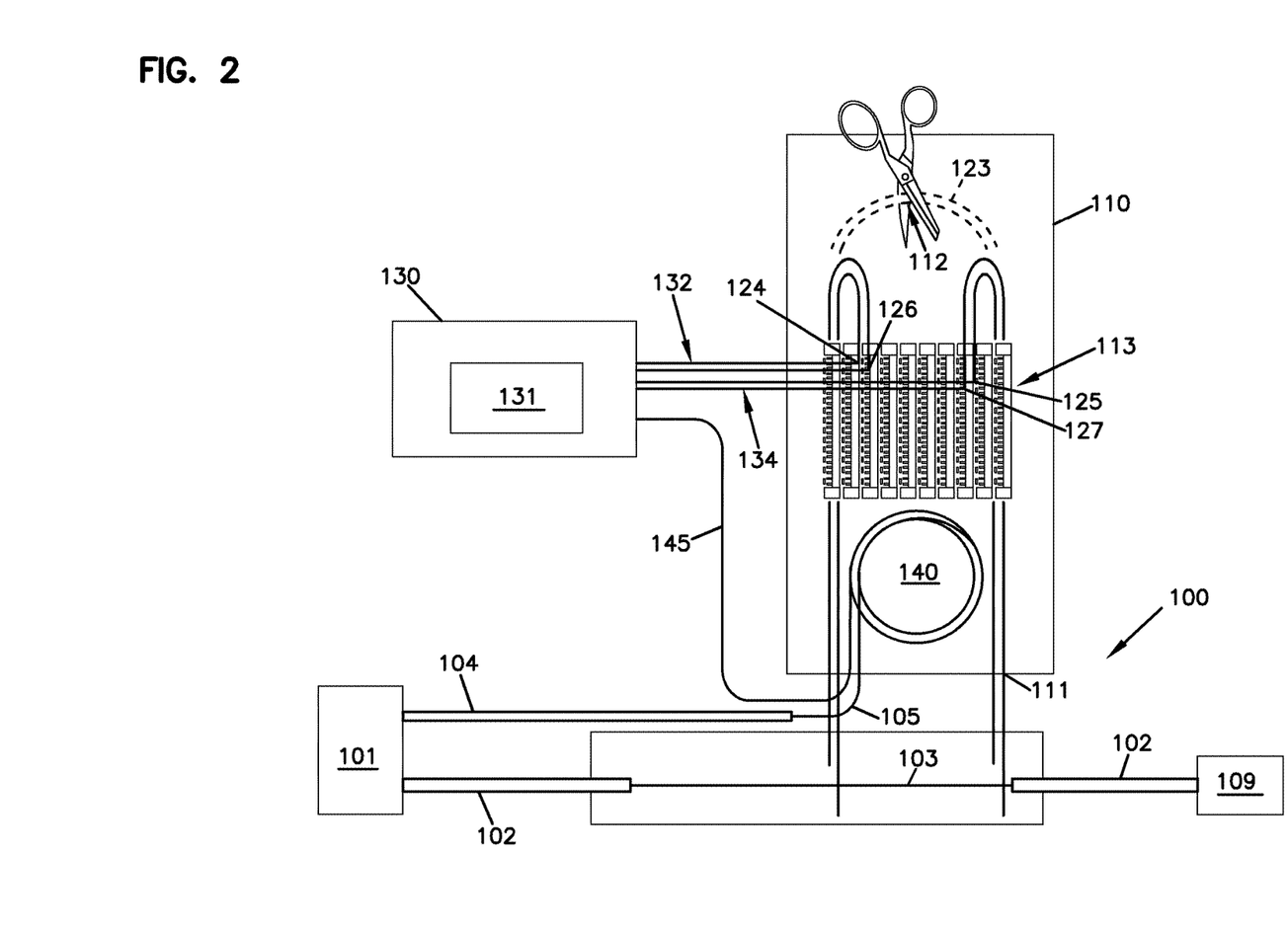
FIG. 2 is a schematic diagram of the network portion of FIG. 1 after subscribers 109 have requested service.

Referring to FIGS. 1 and 2, a portion 100 of a communications network includes a management closure 110 that aids in providing signals from the central office 101 to one or more subscribers 109. Signals directed to the management closure 110 may be directed to equipment for enhancing the signals or altering the media over which the signals are carried. FIG. 1 shows the network portion 100 before any subscribers 109 have requested upgraded service. FIG. 2 shows the network portion 100 after subscribers 109 have requested upgraded service.

Active electronic equipment 131 can be electrically connected to a termination block arrangement 113 disposed within the management closure 110. In certain examples, the active electronic equipment 131 can be disposed in an active electronic closure 130. In certain implementations, the active electronic equipment 131 includes equipment that enhances an electrical signal. For example, the equipment 131 may convert the signal to a higher transmission rate or enhance performance of the signal (e.g., using G.Fast or VDSL equipment). In certain implementations, the active electronic equipment 131 includes equipment that enhances an optical signal. In certain implementations, the active electronic equipment 131 includes equipment that converts an optical signal to an electrical signal and/or converts an electrical signal to an optical signal.

In certain implementations, one or more inputs of the active electronic equipment 131 are electrically connected to termination connection points at the termination block arrangement 113. For example, one or more first active equipment cables 132 can be routed into the management closure 110 and terminated at the termination block arrangement 113. In certain examples, these electrical connections can be made prior to any subscriber requesting service. In certain examples, these electrical connections can be made in a factory prior to installation of the management closure 110. In certain implementations, one or more outputs of the active electronic equipment 131 can be electrically connected to termination connection points at the termination block arrangement 113. For example, one or more second active equipment cables 134 can be routed into the management closure 110 and terminated at the termination block arrangement 113. In certain examples, these electrical connections can be made prior to any subscriber requesting service. In certain examples, these electrical connections can be made in a factory prior to installation of the management closure 110. While described herein as "inputs" and "outputs," it will be appreciated that signals can be carried in both directions between the central office 101 and the subscribers 109. Accordingly, signals can pass through the active equipment 131 in both directions.

In some implementations, the inputs and outputs of the active electronic equipment 131 are connected to the rear side of the termination block arrangement 113 (e.g., at insulation displacement contacts at the rear side). In certain examples, the rear side of the termination block arrangement 113 has a first termination connection region 114 and a second termination connection region 115. The first active equipment cables 132 are terminated at the rear side of the first termination connection region 114 and the second active equipment cables 132 are terminated at the rear side of the second termination connection region 115.

A cable loop 120 extends from a first end 121 to a second end 122, which are disposed at or accessible from an exterior of the management closure 110. The cable loop 120 enters the management closure at a first cable port 111, is looped (see 123) around within the management closure 110 at a looping point 112, and exits the management closure 110 at a second cable port 111. In certain implementations, the cable loop 120 includes a plurality of twisted pair conductors (i.e., differential pairs). For example, a cable loop 120 can include between one and one hundred conductor pairs. In examples, the cable loop 120 can include at least about twenty conductor pairs. In examples, the cable loop 120 can include at least about fifty conductor pairs. Optionally, the conductors of the cable loop 120 are not electrically connected to the termination block arrangement 113 prior to receiving a subscriber activation request.

In certain examples, the twisted pair conductors are separated into groups with each group having twisted pair conductors of the same color sequence. For example, each group will have only one conductor or conductor pair with a first color of insulation (e.g., red), only one conductor or conductor pair with a second color of insulation (e.g., black), etc. In certain examples, the separation of the groups is maintained at the looping point 112 as will be discussed in more detail herein.

The management closure 110 is initially installed at or near an interception box 107. In some implementations, the ends 121, 122 of the cable loop 120 are disposed at the intercept box 107. One or more distribution cables 102 can be routed through the intercept box 107 when routed towards one or more subscribers 109. Each distribution cable 102 includes one or more twisted pairs 103 of conductors (i.e., differential pairs). For example, a distribution cable 102 can include between one and one hundred twisted pairs 103. In certain examples, the distribution cable 102 can include at least about twenty twisted pairs 103. In examples, the distribution cable 102 can include at least about fifty twisted pairs 103.

In some implementations, until service is requested, the distribution cable 102 is not electrically connected to the cable loop 120. As subscribers 109 request service (or upgraded service), conductors (e.g., conductor pairs) 103 of the distribution cable 102 can be connected to conductors (e.g., conductor pairs) of the cable loop 120. Connections can be implemented via termination blocks, optical splicing, etc.

In some implementations, the signals for subscribers arrive from the central office 101 via the one or more distribution cables 102. When service is requested, one or more conductors (e.g., a twisted pair) 103 of the distribution cable 102 are connected to the first cable extension end 121 and second cable extension end 122 at the interception box 107. For example, the distribution cable conductors can be severed so that a first severed end connects to one or more pair at the first cable extension end 121 and a second severed end connects to the respective pair at the second cable extension end 122. Accordingly, signals pass through the management closure 110 en route between the central office 101 and the subscriber 109.

As shown in FIG. 2, when service is requested, the conductor(s) of the cable loop 120 are cut and the cut ends are directed to the termination block arrangement 113. A first cut end 124 of the cable extension conductor is routed to the termination block arrangement 113 to connect to one of the inputs of the active electronic equipment 131. A second cut end 125 of the cable extension conductor is routed to the termination block arrangement 113 to connect to one of the outputs of the active electronic equipment 131. Accordingly, signals pass through the active electronic equipment en route between the central office 101 and the subscriber 109.

In some implementations, the signals for subscribers arrive from the central office 101 via one or more optical fiber cables 104. In such implementations, the management closure 110 includes a fiber tray 140 at which first ends of one or more optical fibers 145 are disposed. The other ends of the one or more optical fibers 145 are routed to respective inputs of the active electronic equipment 131. In certain examples, these electrical connections can be made prior to any subscriber requesting service. In certain examples, these electrical connections can be made during installation of the management closure 110. In certain examples, outputs of the active electronic equipment 131 that correspond with the fiber inputs are routed to the second termination region 115 at the rear side of the termination block arrangement 113.

One or more optical fibers 105 of the fiber input cable 104 can be spliced or otherwise connected to one or more of the optical fibers 145 at the fiber tray 140. In other implementations, the optical fibers 105 can be routed directly to the active electronic equipment 131. In certain examples, the optical fibers 145 or the optical fibers 105 are connected to inputs of the equipment 131 (e.g., a fiber to electrical signal converter) at the active electronic closure 130. In such implementations, the second cut end 127 of the cable loop 120 is routed to the termination block arrangement 113 to connect to one of the outputs of the active electronic equipment 131. The first cut end 126 becomes a dead signal carrier. In an example, the first cut end 126 may be routed to the termination block arrangement 113. In another example, the first cut end 126 may remain at the looping point 112.

For example, in FIG. 2, a fiber 105 is routed into the management closure 110, routed to the fiber tray 140, and spliced to an optical fiber 145 that is routed to an input of active electronic equipment 131. In an example, the optical fiber 145 is routed to an optical-to-electrical signal converter. Signals output from the active electronic equipment 131 are routed to the termination block arrangement 113. A cut end 127 of a cable extension conductor is routed to the termination block arrangement 113 to receive the output signals. The output signals are carried by the cable extension conductor to the intercept box 107 at which the conductor is connected to the distribution cable 102, which routes to one or more subscriber locations.

FIGS. 3-6 illustrate one example implementation of a management closure 110 in accordance with FIGS. 1 and 2. The example management closure 110 includes a base 150 and a cover 160 that cooperate to define an interior. In certain examples, the base 150 and the cover 160 can be sealing connected (e.g., a watertight seal, a dust-tight seal, etc.). The management closure 110 defines two or more cable ports 111. In the example shown, the base 150 defines the cable ports 111. The base 150 extends from a first end 151 to a second end 152. The ports 111 are defined at the first end 151.

In some implementations, the cable loop 120 is installed within the management closure 110. For example, the cable loop 120 can be installed within the base 150 of the management closure 110. In certain examples, the cable loop 120 is installed within the management closure 110 in a clean-room environment. In certain examples, the cable loop 120 is installed by positioning the ends 121, 122 of the cable extension 120 within the management closure 110 or base 150 and inserting the ends 121, 122 through the cable ports 111 so that the ends 121, 122 of the cable loop 120 protrude through the management closure 110 to an exterior of the management closure 110.

In certain examples, the cable jacket of the cable loop 120 is window cut and stripped away at an intermediate location of the cable loop 120 to expose the twisted pairs of wires. In certain examples, the cutting and stripping are implemented within the management closure 110. In certain examples, the cutting and stripping are performed when the management closure 110 is in a clean-room environment. The twisted pairs of wires can optionally be bundled into groups by helically wrapped separators (e.g., binder, string, twine, rope), cable ties, or other such separators. In certain examples, the twisted pair wires are organized in the cable 120 into separate groups often twisted pairs. For example, in the case of a fifty pair cable loop 120, the five groups of ten twisted pairs are routed uncut to five separate pivotal copper management trays 170. In certain examples, the each twisted pair in each group is a different color from the other twisted pairs of the same group. In certain examples, each group has the same sequence of colors.

In certain examples, the management closure 110 can include internal structure (e.g., trays) configured to segregate and separately manage each exposed group. This segregation assists in maintaining the groups and in preventing one or more twisted pairs of one group from being comingled with twisted pairs of another group. While the jacket has been stripped away, the twisted pairs preferably remain uncut until a service upgrade is requested or otherwise desired. Allowing the twisted pairs to remain uncut defers the cost of cutting and managing the cut ends of the twisted pairs until the service upgrade is to be made. Allowing the twisted pairs to remain uncut also reduces installation time of the management closure.

One or more conductor trays 170 are disposed within the interior of the management closure 110. The conductor trays 170 are configured to receive the twisted pairs of conductors of the cable loop 120. In particular, the conductor trays 170 form the looping point 112 for the cable loop 120. In certain examples, the conductor trays 170 maintain the separation of the groups of twisted pair conductors of the cable loop 120. For example, in some implementations, each conductor tray 170 may receive one of the groups. In other implementations, a conductor tray 170 may receive multiple groups that are each tied together or otherwise distinguished from each other. In certain examples, each group of twisted pairs is bundled from the other groups by a colored rope. In some such examples, the tray 170 receiving the group of twisted pairs is the same color as the rope wrapped around the twisted pairs. In other examples, the tray 170 can be color coded to the group within the cable extension to provide simple and/or sustainable identification of the twisted pairs after installation.

In certain examples, the conductor trays 170 are disposed towards the second end 152 of the base 150. The conductor trays 170 are mounted to the base 150 of the management closure 110. The conductor trays 170 are movable to enable access to each conductor tray 170. In certain examples, the conductor trays 170 are configured to pivot relative to the base 150. In certain examples, the conductor trays 170 are configured to slide relative to the base 150. In certain examples, the conductor trays 170 are configured to separate from each other and from the base 150. In certain examples, the conductor trays 170 are stacked on the base 150 one-on-top-of-the-other.

In certain examples, each conductor tray 170 is structured to receive a cable extension at a first end and to provide bend radius limiting for the cable extension while routing the cable extension back towards the first end. In certain examples, each conductor tray 170 can optionally define an open region 175 (see FIG. 6) at a second end along which the twisted pairs of the cable loop 120 extend to facilitate cutting of the twisted pairs. For example, the structure of the conductor tray 170 can be cut away at the open region 175. In an example, the second end is located opposite the first end. In some examples, each conductor tray 170 can optionally be structured to route the twisted pairs of the cable extension in a complete circle before the twisted pairs leave the tray 170. In certain examples, each conductor tray 170 can optionally be structured to route the twisted pairs of the cable extension in multiple complete circles before the twisted pairs leave the tray 170. In other examples, the cable loop 120 can be routed in one or more complete circles around the termination block 113 and the respective conductor tray 170.

Figure 3:
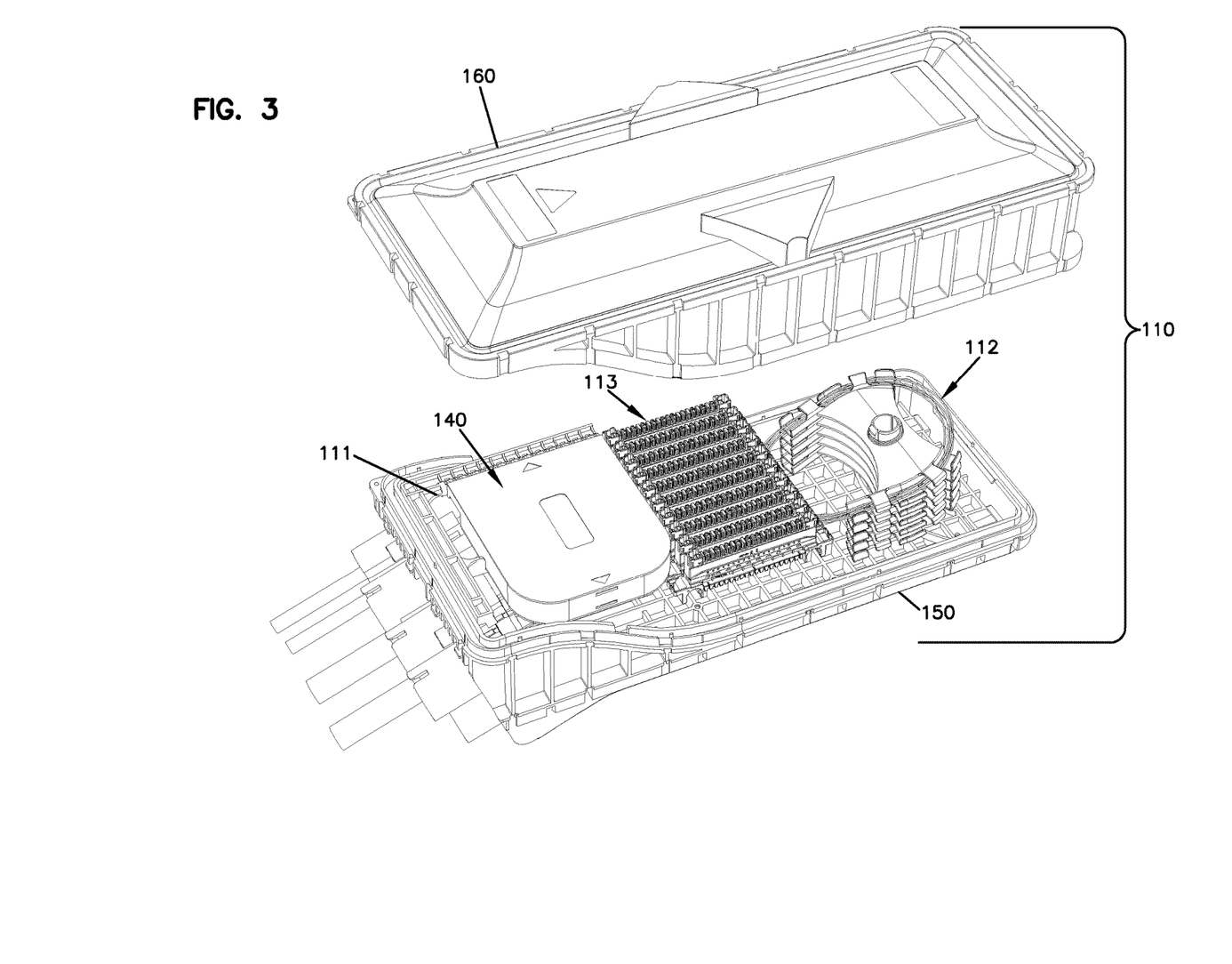
FIG. 3 is a perspective view of an example implementation of the management closure of FIG. 1 showing a cover exploded from a base so that interior components are visible.

A termination block arrangement 113 is disposed within the interior of the management closure 110 between the conductor trays 170 and the cable ports 111 (e.g., see FIG. 3). The termination block arrangement 113 includes insulation displacement contacts at the front side of the block arrangement 113 that electrically connect (e.g., by cutting through the insulation of the wires into the conductive cores of the wires) to insulation displacement contacts at the rear side of the block arrangement 113. The insulation displacement contacts at the rear side are connected to the active equipment 131 of the active electronics box 130 by multiple cables. In certain examples, the multiple cables can be routed between the management closure 110 and a separate active equipment closure 130. In certain examples, a first group of insulation displacement contacts at the rear side define the first termination connection region 114 and are connected to inputs of the equipment 131 and a second group of insulation displacement contacts at the rear side define the second termination connection region 115 and are connected to outputs of the equipment 131.

When cut ends of the distribution cable 102 are connected to one or both ends 121, 122 of the cable loop 120, the distribution cable 102 can be connected to the active equipment 131 via the cable loop 120 and the insulation displacement contacts at the front side of the termination block arrangement 113. For example, a first cut end 124 of a first twisted pair cable of the cable loop 120 can be routed to one of the insulation displacement contacts that is located at the front side of the termination block 113 and that is electrically connected to one of the rear insulation displacement contacts of the first group. Likewise, a second cut end 125, 127 of the first twisted pair cable of the cable loop 120 can be routed to one of the insulation displacement contacts that is located at the front side of the termination block 113 and that is electrically connected to one of the rear insulation displacement contacts of the second group. Thus, signals can effectively be routed from the central office to the intercept box 107, from the intercept box 107 to the management closure 110, from the management closure 110 to the active electronics box 130, from the active electronics box 130 back to the management closure 110, and from the management closure 110 back to the intercept box and on to the subscriber.

In certain examples, the rear insulation displacement contacts of the first group are located at one side of the termination block arrangement 113 and the rear insulation displacement contacts of the second group are located at an opposite side of the termination block arrangement 113. In certain examples, the termination block arrangement 113 includes one or more termination blocks. In some examples, the rear insulation displacement contacts of the first group are defined by some of the termination blocks and the rear insulation displacement contacts of the second group are defined by others of the termination blocks. In other examples, one or more termination blocks may include rear insulation displacement contacts of both the first and second groups.

In an example, each electrically connected pair of front and rear insulation displacement contacts is optionally monolithically formed. In an example, each termination block includes front insulation displacement contact terminations for ten twisted pairs electrically connected to rear insulation displacement contact terminations for ten twisted pairs. In other examples, the termination blocks can be any desired size and have any desired capacity.

A fiber tray 140 disposed within the interior of the management closure 110 between the termination block arrangement 113 and the cable ports 111. In some implementations, the fiber tray 140 is elevated relative to a bottom 153 of the base 150. Elevating the fiber tray 140 enables the cable loop 120 to be routed beneath the fiber tray 140. Optionally, elevating the fiber tray 140 enables the cables routed between the active electronic equipment 131 and the termination block arrangement 113 (e.g., the rear side of the block arrangement to extend beneath the fiber tray 140.

Figure 5:
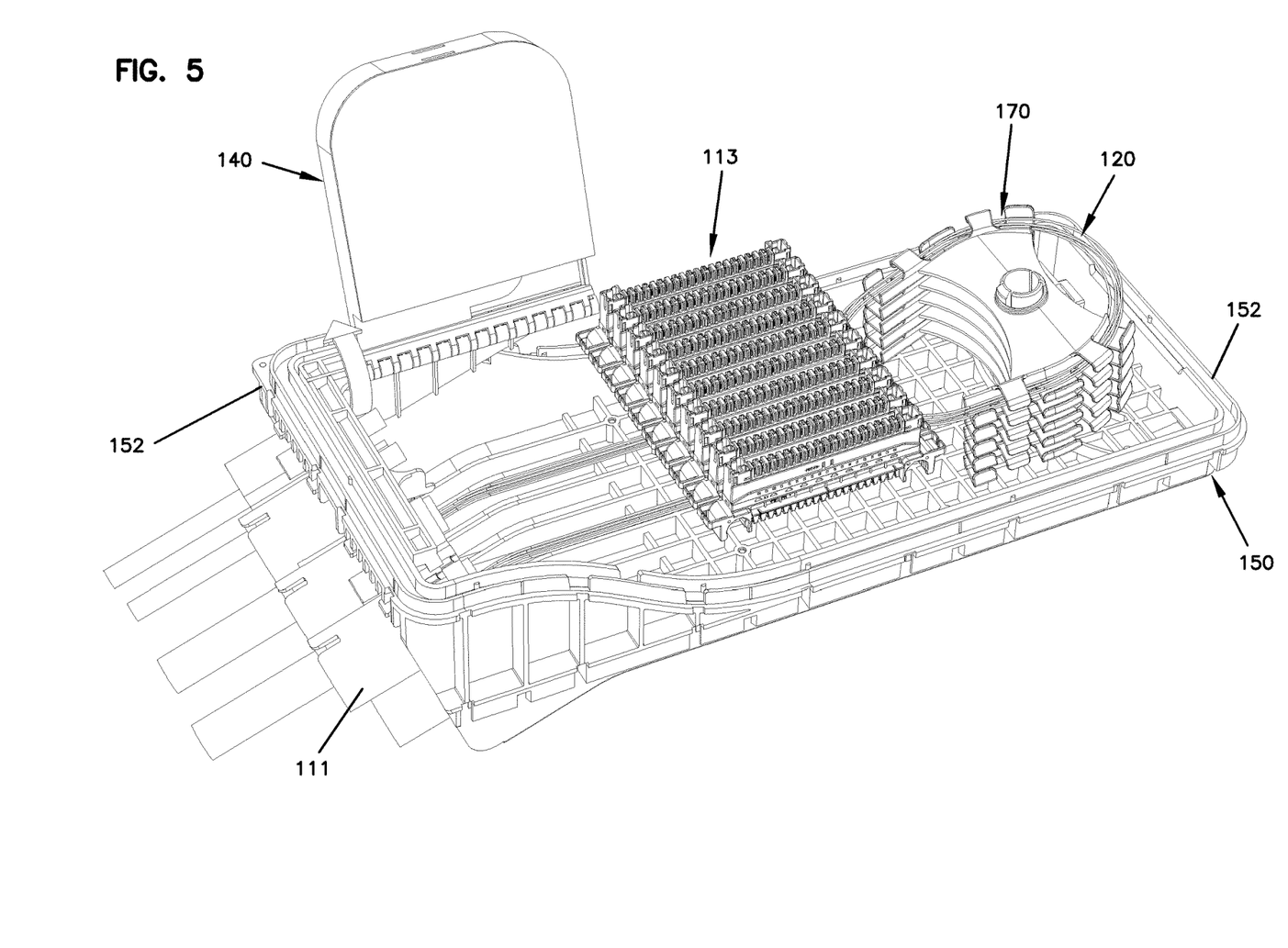
FIG. 5 is a perspective view of the base of FIG. 3 with the fiber tray pivoted to a raised position.
Figure 6:
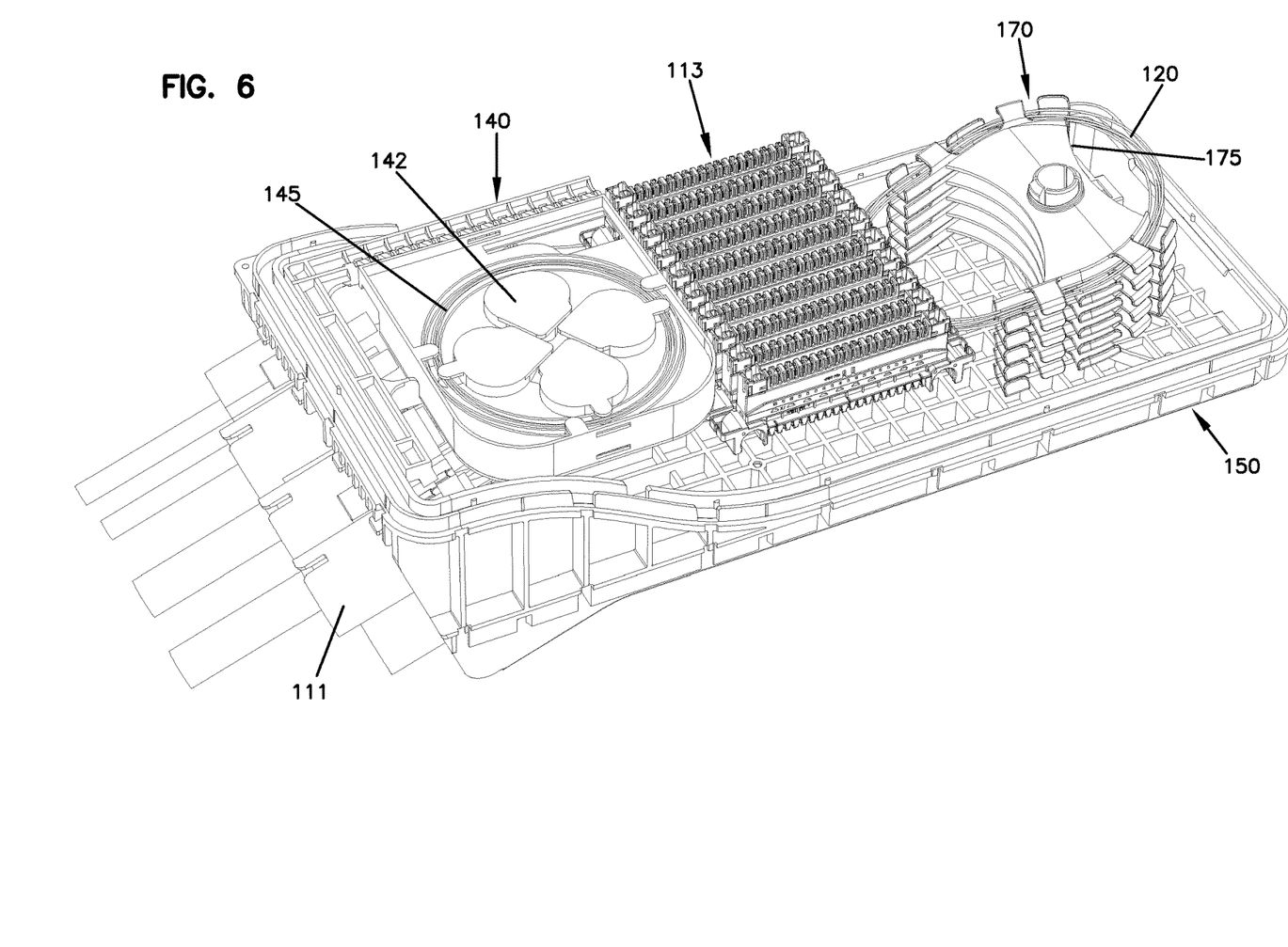
FIG. 6 is a perspective view of the base of FIG. 3 with a portion of the fiber tray removed for ease in viewing internal components.

The fiber tray 140 is pivotally mounted to the management closure 110 such that the fiber tray 140 is offset from a bottom of the management closure 110 (e.g., see FIG. 5). The fiber tray 140 is configured to pivot between a raised position (FIG. 5) and a lowered position (FIG. 3). As shown in FIG. 6, the fiber tray 140 includes one or more bend radius limiters 142 at which excess length of the optical fibers 104, 145 can be stored. In certain examples, the fiber tray 140 also includes splice holder chips or other structure for holding optical splices. In certain examples, the fiber tray 140 may have a lid that is pivotable and/or removable from a remainder of the tray to provide access to the bend radius limiters and/or splice holders. In an example, the splice holder(s) is located at a top of the fiber tray 140 and the storage area is located at a bottom of the fiber tray 140.

Figure 4:
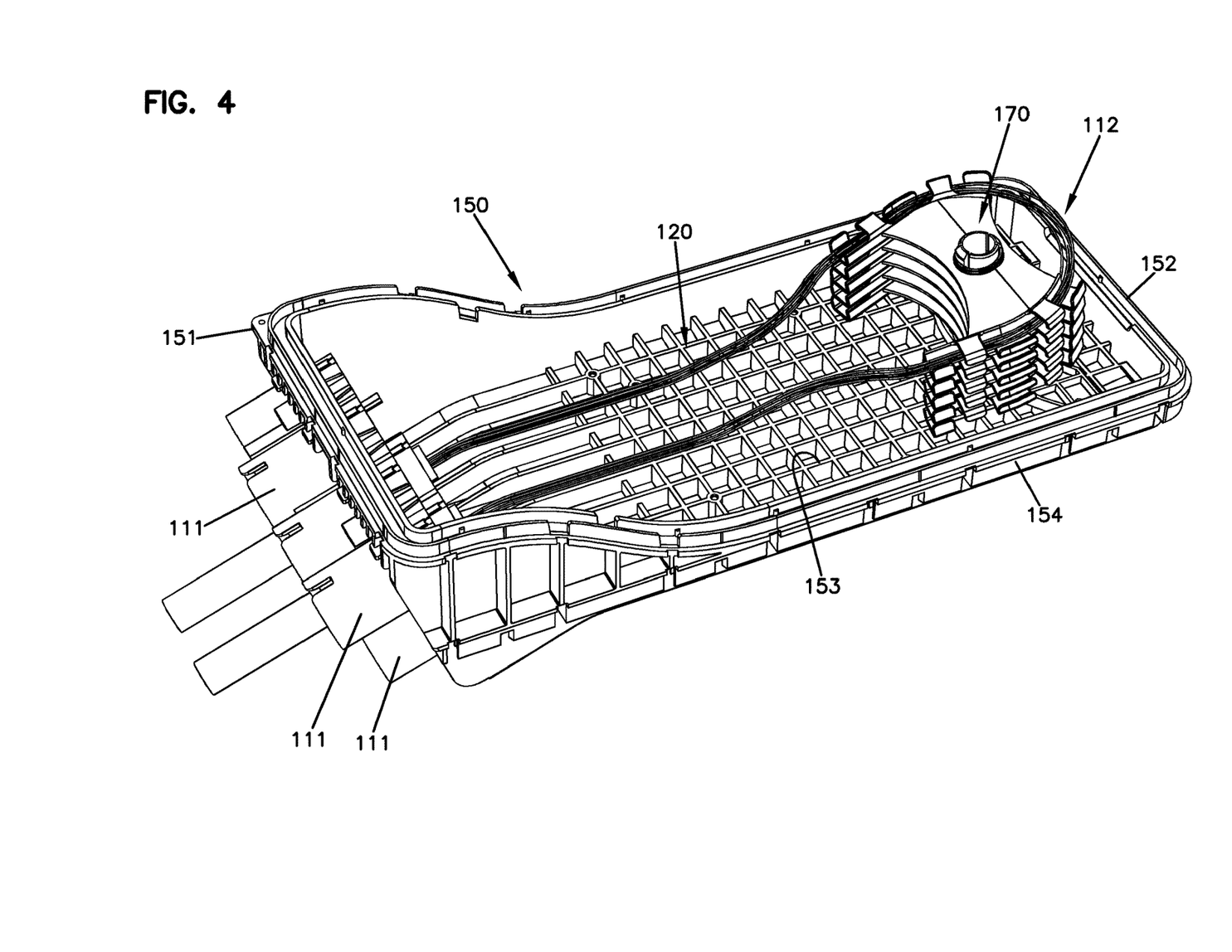
FIG. 4 is a perspective view of the base of FIG. 3 with a fiber tray and a termination block arrangement removed for ease in viewing.

As shown in FIG. 4, the base 150 of the management closure 110 includes a sidewall 154 extending upwardly from the bottom 153. The cable loop 120 enters the base 150 through the cable ports 111, extends along the bottom 153 of the base 150, loops (see 123) around one of the conductor trays 170, extends along the bottom 152 back to the cable ports 111, and exits the management closure 110. In certain examples, the conductor trays 170 are sized and positioned to provide a sufficient length of cable loop 120 so that the cut ends 124, 125 are sufficiently long to route to any termination position (e.g., any insulation displacement contact) on the termination block arrangement 113.

In certain examples, the termination block arrangement 113 is coupled to the base 150 so as to be positioned over the cable loop 120 so that the cable loop 120 passes between the termination block arrangement 113 and the bottom 153 of the base 150. In certain examples, the fiber tray 140 is coupled to the base 150 so as to be positioned over the cable loop 120 so that the cable loop 120 passes between the fiber tray 140 and the bottom 153 of the base 150. For example, the fiber tray 140 can be positioned to be elevated off the bottom 153 of the base 150 even when in disposed in the lowered position.

Prior to or during installation of the management closure 110, one or more twisted pairs or twisted pair cables are routed between some of the rear insulation displacement contacts at the termination block arrangement 113 and the inputs of the active electronic equipment 131 (see FIG. 1). One or more twisted pairs or twisted pair cables also are routed between others of the rear insulation displacement contact at the termination block arrangement 113 and the outputs of the active electronic equipment 131. In some examples, the active electronic equipment closure 130 is coupled to the management closure 110. In certain examples, the active electronic equipment closure 130 is disposed within the management closure 110. In other examples, the active electronic equipment closure 130 is spaced from the management closure 110.

As shown in FIG. 4, the cable loop 120 extends into the interior of the management closure 110 through a first of the cable ports 111, is routed to the conductor trays 170, and is routed out of the interior through a second of the cable ports 111. Conductors of the cable loop 120 can be separated into groups with each group being routed along a respective conductor tray 170. In certain examples, the conductors within each group can be uniquely colored so that each group includes only one conductor that is a first color (e.g., red) and only one conductor that is a second color (e.g., blue). Such separation facilitates identification of the conductors.

As shown in FIG. 5, bundled portions of the cable loop 120 are optionally accessible by pivoting the fiber tray 140 to a raised position. As shown in FIG. 6, a lid or cover of the fiber tray 140 may optionally be removable to provide access to optical fiber storage and/or optical splices.

LIST OF REFERENCE NUMERALS AND CORRESPONDING FEATURES 100 portion of a communications network
101 central office
102 distribution cable
103 twisted pairs
104 fiber input cable
105 optical fibers
107 intercept box
109 subscriber
110 management closure
111 cable ports
112 looping point
113 termination block arrangement
114 first termination connection region
115 second termination connection region
120 cable loop
121 first end
122 second end
123 intermediate portion
124, 126 first cut end
125, 127 second cut end
130 active electronic equipment closure
131 active electronic equipment
132 first active equipment cables
134 second active equipment cables
140 fiber tray
145 optical fibers
150 base
151 first end
152 second end
153 bottom
154 sidewall
160 cover
170 conductor trays
175 open region

What is claimed is:

1. A method for providing upgraded service to a subscriber, the method comprising:
   providing a management closure suitable for being installed at a distribution point of a telecommunications network;
   installing termination blocks in the management closure, the termination blocks including insulation displacement contacts, wherein installation of the termination blocks includes terminating twisted wire pairs of at least one multi-pair active equipment cable to the insulation displacement contacts; and
   installing a multi-pair cable loop in the management closure, the multi-pair cable loop including a plurality of segregated groups of twisted wire pairs, the multi-pair cable loop having an intermediate portion where an outer cable jacket has been at least partially removed to provide access to the segregated groups of twisted wire pairs and end portions where the jacket is intact, wherein installation of the cable loop includes routing the jacketed ends of the cable loop out of the management closure and managing the segregated groups of twisted wire pairs on separate conductor trays within the management closure;
   wherein the twisted wire pairs of the cable loop are not cut during initial installation of the management closure, but are cut later at a time of an upgrade request and are then terminated to the termination blocks.

2. The method of claim 1, wherein the termination blocks and the cable loop are installed at a factory.

3. The method of claim 2, wherein the twisted wire pairs of the cable loop are not cut in the factory.

4. The method of claim 1, wherein two multi-pair active equipment cables are terminated to the termination blocks, and routed out of the management closure.

5. The method of claim 4, wherein the insulation displacement contacts include front insulation displacement contacts located at a front side of the termination blocks and rear insulation displacement contacts located at a rear side of the termination blocks, and wherein the two multi-pair active equipment cables are terminated to the rear insulation displacement contacts.

6. The method of claim 5, wherein the front insulation displacement contacts are electrically coupled to the rear insulation displacement contacts, and wherein the twisted wire pairs of the cable loop are terminated to the front insulation displacement contacts.

7. The method of claim 2, further comprising removing the outer cable jacket from the intermediate portion of the cable loop at the factory.

8. The method of claim 2, wherein managing the segregated groups of twisted wire pairs on the separate conductor trays comprises routing the segregated groups of twisted wire pairs onto the conductor trays at the factory.

9. The method of claim 1, wherein managing the segregated groups of twisted wire pairs on the separate conductor trays enables identification of the twisted wire pairs before and after subscriber service is upgraded.

10. The method of claim 1, further comprising routing an active equipment optical fiber into a fiber tray at the management closure.

11. A method for providing upgraded service to a first subscriber using a management closure installed adjacent an intercept box through which a distribution cable extends, the distribution cable being electrically connected to a central office and to at least the first subscriber, the management closure for providing upgraded service to a subscriber, the management closure including:
a closure body;
a plurality of termination blocks disposed in the closure body, the termination blocks including a plurality of insulation displacement contacts,
at least one multi-pair active equipment cable including a plurality of twisted wire pairs terminated at some of the insulation displacement contacts;
a multi-pair cable loop disposed in the closure body, the multi-pair cable loop including a plurality of segregated groups of twisted wire pairs, the multi-pair cable loop having an intermediate portion and end portions, wherein an outer cable jacket has been at least partially removed from the intermediate portion thereby providing access to the segregated groups of twisted wire pairs, and wherein the outer cable jacket is intact at the end portions of the cable loop, wherein the jacketed ends of the cable loop extend out of the management closure; and
a plurality of conductor trays disposed in the closure body, each of the conductor trays managing at least one of the segregated groups of the cable loop, the method comprising:
receiving a subscriber upgrade request from the first subscriber;
cutting a twisted pair of the distribution cable to form a first cut end that is electrically coupled to the central office and a second cut end that is electrically coupled to the first subscriber;
connecting the second cut end of the distribution cable to the first twisted pair of the cable loop at a second of the end portions of the cable loop, thereby connecting the first twisted pair of the cable loop to the first subscriber via the distribution cable;
cutting the first twisted pair of the cable loop within the management closure to create first and second cut ends of the first twisted pair; and
connecting the second cut end of the first twisted pair to one of the twisted wire pairs of the multi-pair active equipment cable at the termination block arrangement.

12. The method of claim 11, further comprising connecting the first cut end of the first twisted pair to a twisted wire pair of a second multi-pair active equipment cable at the termination block arrangement.

13. The method of claim 11, wherein the twisted wire pairs of the multi-pair active equipment cable and the second multi-pair active equipment cable are coupled to rear insulation displacement contacts of the termination block; and wherein the first and second cut ends of the first twisted pair of the cable loop is connected to front insulation displacement contacts of the termination block, the front insulation displacement contacts being electrically connected to the rear insulation displacement contacts.

14. The method of claim 11, further comprising:
routing an optical fiber into the management closure; and
splicing the optical fiber to an active equipment optical fiber at a fiber tray.

* * * * *